Jan. 29, 1924.

J. P. RATIGAN

CLAMP

Filed Jan. 4, 1922

1,482,148

INVENTOR.
James P. Ratigan.
BY Lyon & Lyon
ATTORNEYS.

Patented Jan. 29, 1924.

UNITED STATES PATENT OFFICE.

JAMES P. RATIGAN, OF LOS ANGELES, CALIFORNIA.

CLAMP.

Application filed January 4, 1922. Serial No. 526,966.

*To all whom it may concern:*

Be it known that I, JAMES P. RATIGAN, a citizen of Great Britain, residing at Los Angeles, in the county of Los Angeles and State of California, have invented a new and useful Clamp, of which the following is a specification.

This invention relates to clamps of the type employed in the well drilling and pumping art, and an object of the invention is to provide a reliable clamp of this nature to securely hold the polish rod, or other element of the well drilling or pumping mechanism so that the polish rod and the parts suspended therefrom, or any other elements held by the clamp, may be raised from the well and lowered thereinto, as occasion demands.

Another object is to prevent bending of the clamping screw or screws when they are loosened sufficiently to relieve pressure of the block upon the polish rod or other element held by the clamp.

A further object is to provide for connecting the clamp to a suspension tackle in such manner that the clamping screws will be readily accessible and, at the same time, the clamp will be in balance when supported by the suspension tackle.

The accompanying drawings illustrate the invention:

Figure 1:
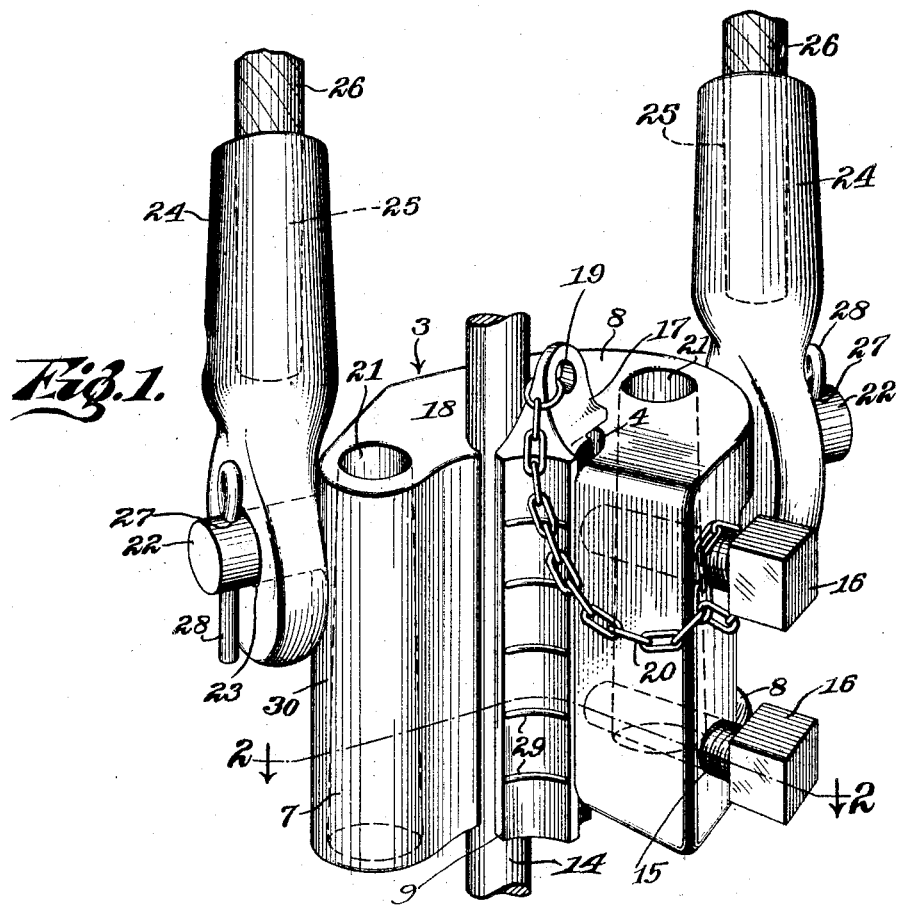
Fig. 1 is a perspective view of a clamp constructed in accordance with the provisions of this invention.

There is provided a body indicated in general by the character 3 provided in one face with a longitudinally extending groove 4. The inner face of one side wall of the groove 4 is channeled, preferably being V-shaped as indicated at 5. The wall at the other side of the groove is indicated at 6. Extending outwardly from the face 5 is a nose 7. The body 3 is provided with upper and lower rearwardly extending flanges 8 to strengthen the body. The necessity for providing a very strong construction for a clamp of this nature will be the more readily comprehended when it is held in mind that the clamp is often required to support a sucker line of several thousands of feet in length or other elements of great weight.

Adapted to be positioned lengthwise in the groove 4 is a clamping block 9, one or more faces of which are grooved parallel with the groove 4. In the particular instance shown in the drawings, the block is provided with four grooves of varying widths, as indicated at 10, 11, 12 and 13. The grooves in the block preferably have curved faces so as to approximately fit the peripheries of the various elements which are to be supported by the clamp. In the drawings I have shown a polish rod 14 engaging at one side the clamp face 5 and engaging at its other side the groove 10 of the clamping block 9.

To adjustably hold the clamping block 9 in engagement with the rod 14, or other element to be supported, I provide a screw or screws 15 which are threaded through the wall 6 and project into the groove 4 at a point opposite to the V-shaped face 5. The screws 15 are provided with square heads 16 to form wrench seats so that said screws may be turned by a wrench applied thereto. In the instance shown in the drawings the inner ends of the screws 15 engage the groove 12 of the block 9.

There are provided suitable means for preventing downward bending of the inner ends of the screws 15 when said screws are loosened to relieve pressure of the block 9 upon the rod 14, since, when the screws are loosened, the block 9 would tend to be pulled downwardly by the polish rod 14. These means may be variously constructed within the scope of the appended claims and, in this instance, to prevent downward slipping of the block the upper end of the block 9 is provided with a head forming a lateral projection or shoulder 17 adapted to seat upon the flat top face 18 of the body 3. The block 9 is provided at its upper end with an eye 19, to which is secured one end of a flexible connection 20, in this instance a chain that has its opposite end encircling one of the screws 15. This chain 20 prevents complete separation of the block and body so that the block will always be held in position to make it readily accessible to the operator for placing it in clamping position.

The body 3 may be provided longitudinally thereof with sockets 21 to receive the ends of the cables of the suspension tackle, not shown. However, I prefer in some instances to pivotally connect the suspension tackle with the body 3, and for that reason I provide studs 22 projecting laterally from the wall 6 and nose 7. These studs are circular in cross section, and pass through eyes 23 of cable-coupling members 24 having sockets 25 in which may be secured the ends of the cables 26 of the suspension tackle. The studs project beyond the outer faces of the members 24, and are provided in the projecting portions with transversely extending holes 27 in which are placed cotter pins 28 to detachably hold the cable-coupling members 24 on the studs.

The means described above for connecting the body 3 with the suspension tackle may be otherwise constructed within the scope of the appended claims and, in any event, the connecting means will be positioned on opposite sides of the prolonged axis of the screw or screws 15, the body having a leg 30 disposed at an angle to the axis of the screw 15 and said leg being provided with one of the sockets 21 and studs 22. The connecting means are in a plane that passes through the axis of the rod that is held by the clamp. Thus the suspension tackle will not interfere with turning of the screws 15 and the clamp will be in balance when suspended from the tackle with a sucker line supported by the clamp.

Figure 2:
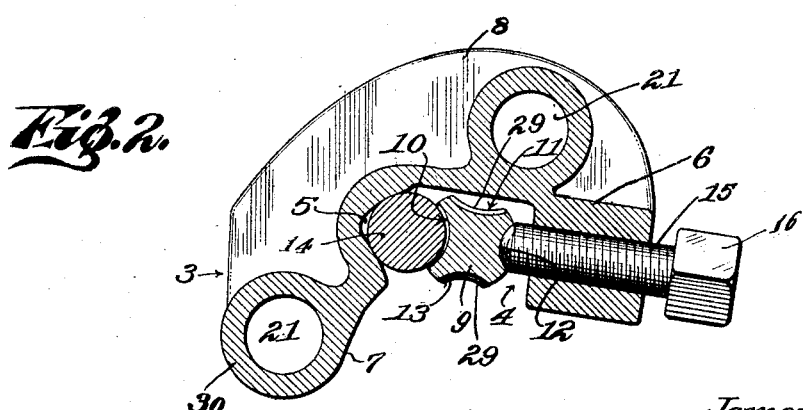
Fig. 2 is a plan section, approximately on the irregular line indicated by 2—2, Fig. 1.

Assuming that the body 3 is suspended by suitable tackle, that the screws 15 are in retracted position, and that the block 9 is displaced from the groove 4, to effect clamping of the polish rod 14, the body 3 will be swung into position to cause the polish rod to be positioned in the groove 4. Then the clamping block 9 will be lowered endwise into the groove 4 in position to cause one of its grooved faces to engage the rod 14. The block will be lowered until the shoulder 17 rests upon the upper face of the body 3, thus supporting said block. Then the screws 15 will be tightened to force the block toward the V-shaped face 5 so as to securely clamp the rod 14 between the face 5 and block 9 as clearly shown in Fig. 2.

If desired, the grooved faces of the block may each be provided with a series of transverse ridges 29 to more securely clamp the smooth polish rod or other element.

The invention is not limited to the exact construction shown in the drawings and above described, but may be embodied in any form falling within the scope of the appended claims.

I claim:

1. A clamp of the character described, comprising a body having a groove, one wall of the groove being channeled to receive a polish rod, a block in the groove having a groove opposed to the channel, a screw passing through the wall of the groove opposite to the channel and loosely engaging the block to force it toward the channel, and means on opposite sides of the prolonged axis of the screw to connect the body with a suspension tackle, the body having a leg disposed at an angle to the axis of the screw and said leg being provided with one of the said connecting means and the connecting means being in a plane that passes through the axis of the rod that is held between the body and block.

2. A clamp of the character described, comprising a body having a groove, one wall of the groove being channeled to receive a polish rod, a block in the groove having grooves in its opposite faces, one of the grooves in the block being opposed to the channel, a screw passing through the wall of the groove opposite to the channel and engaging loosely in the other groove of the block, and means on opposite sides of the prolonged axis of the screw to connect the body with a suspension tackle, the body having a leg disposed at an angle to the axis of the screw and said leg being provided with one of the said connecting means and the connecting means being in a plane that passes through the axis of the rod that is held between the body and block.

3. A clamp of the character described, comprising a body having a groove, one wall of the groove being channeled to receive a polish rod, a block in the groove having a groove opposed to the channel, means loosely engaging the block to force said block toward the channel, there being a lateral projection on the block engaging the body to prevent downward slipping of the block in the body when the block-forcing means are retracted, and means on opposite sides of the body to connect said body with a suspension tackle, the body having a leg disposed at an angle to the axis of the screw and said leg being provided with one of said connecting means and the connecting means being in a plane that passes through the axis of the rod that is held between the body and block.

Signed at Los Angeles, California, this 28th day of December, 1921.

JAMES P. RATIGAN.

Witnesses:
GEORGE H. HILES,
L. BELLE WEAVER.